No. 765,670. PATENTED JULY 26, 1904.
A. H. MARKS.
DOUBLE TUBE PNEUMATIC TIRE.
APPLICATION FILED MAR. 3, 1904.
NO MODEL.
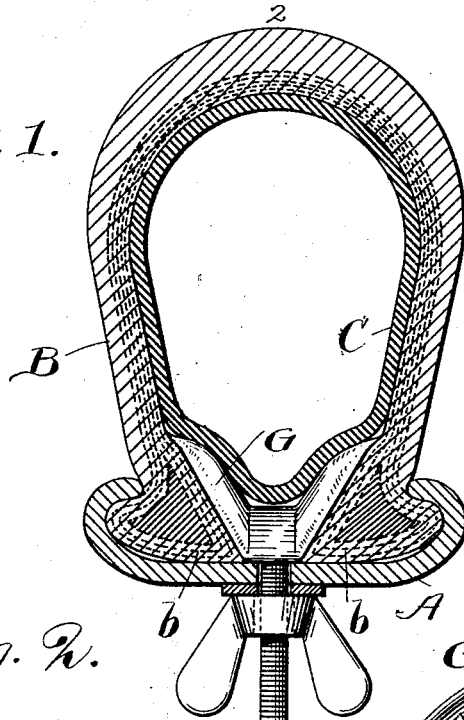
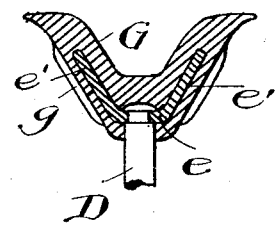
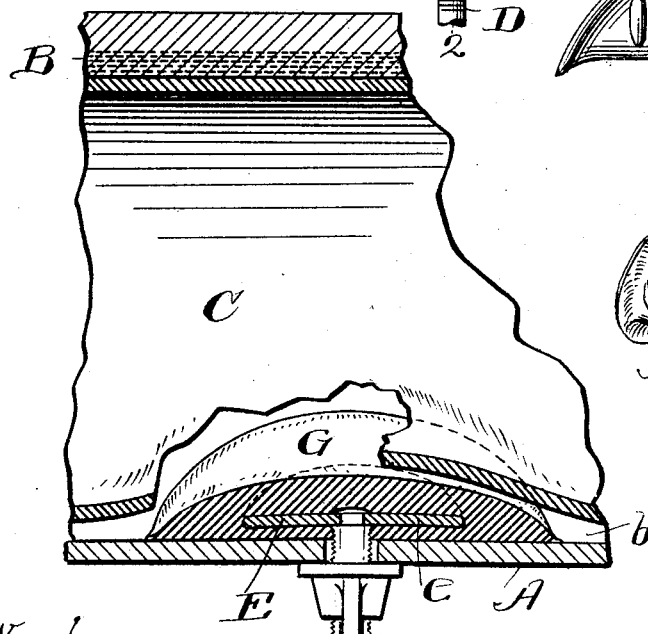
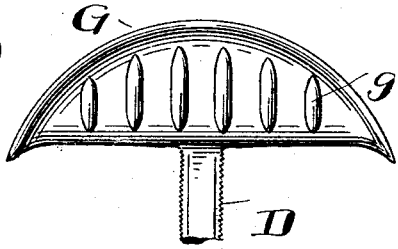
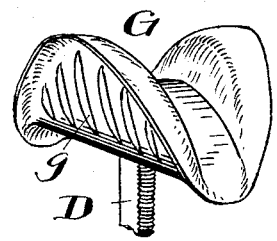
WITNESSES.
E. B. Gilchrist
J. B. Hill
INVENTOR.
Arthur H. Marks,
By his Attorneys
Thurston & Bates No. 765,670. Patented July 26, 1904.

UNITED STATES PATENT OFFICE.

ARTHUR H. MARKS, OF AKRON, OHIO, ASSIGNOR TO THE DIAMOND RUBBER COMPANY, OF AKRON, OHIO, A CORPORATION OF WEST VIRGINIA.

DOUBLE-TUBE PNEUMATIC TIRE.

SPECIFICATION forming part of Letters Patent No. 765,670, dated July 26, 1904.

Application filed March 3, 1904. Serial No. 196,377. (No model.)

*To all whom it may concern:*

Be it known that I, ARTHUR H. MARKS, a citizen of the United States, residing at Akron, in the county of Summit and State of Ohio, have invented a certain new and useful Improvement in Double-Tube Pneumatic Tires, of which the following is a full, clear, and exact description, reference being had to the accompanying drawings.

This invention is an improvement in double-tube tires of the clencher type; and it relates particularly to the stay-bolts adapted to supplement the air-pressure in holding the outer cover or sheath in clenching engagement with the rim. The invention consists in the stay-bolt, substantially as shown and described, and in the combination of said bolt with a clencher tire and rim, all of which will be definitely set forth in the claims.

In the drawings, Figure 1 is a transverse sectional view of a tire embodying my invention. Fig. 2 is a sectional view of a section of said tire in the plane indicated by line 2 2 of Fig. 1. Fig. 3 is a side view of the stay-bolt. Fig. 4 is a perspective view thereof, and Fig. 5 is a transverse sectional view thereof.

Referring to the parts by letters, A represents the ordinary clencher-rim, whose edges are bent into hook form, B the ordinary outer cover or sheath, which is provided with hook-shaped edges $b$, and C the ordinary inner tube. The stay-bolt consists of the flat threaded stem D, which passes through a correspondingly-shaped hole in the rim, and a metal plate E, to the base of which said stem is fixed. Said plate has a flat base $e$ and diverging sides $e'$, and said head is covered with rubber G, which is vulcanized after it has been molded around said metal head. A number of these stay-bolts are employed to hold the tire upon the rim. When serving this purpose, the rubber-covered head lies between the inner tube and the rim and also between the two edges of the sheath, in which latter position it acts after the fashion of a wedge to thrust said sheath edges apart and under the overhanging edges of the rim. The particular shape of this rubber-covered head has much to do with its efficiency. The marginal edge of this rubber head is beveled or rounded outward, or, in other words, upon that side with which the inner tube engages the marginal edge of this rubber cover is beveled down to a thin edge, where it engages with the rim and with the sheath. This construction does not offer any sharp edges over which the inner tube may bend sharply when it is inflated. As will be seen from Figs. 3, 4, and 5, these thin beveled edges normally bend outward slightly, so that when this rubber-covered head is drawn in between the sheath edges and down upon the rim these beveled rubber edges will be bent upward and inward out of their normal positions, and this will cause them to closely hug the surfaces with which they contact. There is therefore no possibility that the inner tube may be caught or pinched between this rubber head and the parts with which it contacts. It will be also noticed, particularly in Figs. 3, 4, and 5, that on the outer surface of the inclined sides of this rubber head are outwardly-projecting ribs $g$. These of course engage with the inner portions of the sheath. These ribs will be compressed if necessary in order to permit the head to be drawn squarely down against the rim between the edges and the sheath. In any event they afford a rough surface between the sheath and the bolt-head, which effectually prevents any possible slipping of the sheath relative to said head.

Having described my invention, I claim—

1. A stay-bolt for a clencher-tire consisting of a metal plate having outwardly-diverging sides, and a threaded stem fixed to the base of said plate, said metal plate having a rubber cover vulcanized thereon.

2. A stay-bolt for a clencher-tire, consisting of a metal plate having outwardly-diverging sides, and a threaded stem fixed to the base of said plate, said metal plate having a rubber cover vulcanized thereon, which cover has outwardly-beveled marginal edges.

3. A stay-bolt for clencher-tires, consisting of a metal plate having outwardly-diverging sides, and a threaded stem fixed to the base of said metal plate, said plate having a rubber cover vulcanized thereon, which cover has outwardly-beveled marginal edges, the outermost parts of which edges normally bend outward.

4. A metal plate having outwardly-diverging sides, and a threaded stem fixed to the base of said plate, said metal plate having a rubber cover vulcanized thereon, which cover has a plurality of ribs formed on its outer inclined faces.

5. The combination with a wheel-rim having inwardly-bent hook-shaped edges, a tire-sheath having the usual hook-shaped edges, and an inner tube, with a stay-bolt comprising a rubber-covered plate having diverging sides which fit wedge-like between the inner edges of said sheath, and a threaded bolt attached to said plate and extended inward through said rim, the marginal edges of the rubber cover being beveled to a thin edge.

In testimony whereof I hereunto affix my signature in the presence of two witnesses.

ARTHUR H. MARKS.

Witnesses:
E. L. THURSTON,
E. B. GILCHRIST.